(12) United States Patent
Dibowski et al.

(10) Patent No.: US 11,292,574 B2
(45) Date of Patent: Apr. 5, 2022

(54) CLAMPING AND HOLDING DEVICE FOR WALL MODULES

(71) Applicant: SFS intec Holding AG, Heerbrugg (DE)

(72) Inventors: Marc Dibowski, Stelle (DE); Benjamin Diehl, Rosengarten (DE); Sascha Costabel, Jettingen (DE)

(73) Assignee: SFS intec Holding AG, Heerbrugg (CH)

( * ) Notice: Subject to any disclaimer, the term of this patent is extended or adjusted under 35 U.S.C. 154(b) by 108 days.

(21) Appl. No.: 16/819,251

(22) Filed: Mar. 16, 2020

(65) Prior Publication Data

US 2020/0290720 A1 Sep. 17, 2020

(30) Foreign Application Priority Data

Mar. 14, 2019 (EP) ..................................... 19162939

(51) Int. Cl.
*B64C 1/40* (2006.01)
*B64C 1/06* (2006.01)
*F16B 2/10* (2006.01)

(52) U.S. Cl.
CPC .............. *B64C 1/403* (2013.01); *B64C 1/066* (2013.01); *F16B 2/10* (2013.01)

(58) Field of Classification Search
CPC . B64C 1/066; B64C 1/403; F16B 2/10; Y02T 50/40
See application file for complete search history.

(56) References Cited

U.S. PATENT DOCUMENTS

| 2,617,458 | A | * | 11/1952 | Kelly | ......................... B25B 5/12 81/372 |
| 2,837,806 | A | * | 6/1958 | Hawie | ......................... F16B 2/24 24/328 |
| 3,142,103 | A |   | 7/1964 | Lindblad | |
| 3,531,835 | A | * | 10/1970 | Paikin | ......................... A41F 1/00 24/516 |
| 3,593,386 | A | * | 7/1971 | Hug | ................... A47G 25/0607 24/457 |
| 3,766,925 | A | * | 10/1973 | Rubricius | ............ A61B 17/122 606/120 |
| 4,463,482 | A | * | 8/1984 | Hawie | ....................... A41F 3/02 24/489 |
| 4,854,016 | A | * | 8/1989 | Rice | ..................... A61G 13/101 24/495 |

(Continued)

FOREIGN PATENT DOCUMENTS

| DE | 4208493 | 9/1993 |
| EP | 0561107 | 9/1993 |

*Primary Examiner* — David M Upchurch
(74) *Attorney, Agent, or Firm* — Volpe Koenig

(57) ABSTRACT

A holding device for a wall module 10 of the cabin lining in an aircraft includes two different clamping devices. The first clamping device 30 has a clamping body 33 having a first clamping jaw 31, which is fixed relative to the clamping body, and a second clamping jaw 32, which is movable relative to the clamping body 33, which in turn is operatively connected or can be temporarily connected to an actuating lever 35. In the closed state, the clamping jaws 31, 32 form a receiving space 36 for the wall module 10. An interlocking device 37 fixes the position of the clamping jaws 31, 32 relative to one another in the closed state.

14 Claims, 7 Drawing Sheets

(56) References Cited

U.S. PATENT DOCUMENTS

| | | | | |
|---|---|---|---|---|
| 4,976,721 | A | * | 12/1990 | Blasnik .............. A61B 17/1227 24/523 |
| 5,103,839 | A | * | 4/1992 | Shichman ............ A61B 17/122 128/898 |
| 5,263,665 | A | | 11/1993 | Koneczny et al. |
| 5,680,680 | A | | 10/1997 | LaConte |
| 9,995,325 | B2 | * | 6/2018 | Gibb ......................... G09F 7/18 |
| 2004/0045133 | A1 | * | 3/2004 | Buettell .................... A45F 5/02 24/3.12 |
| 2004/0168286 | A1 | * | 9/2004 | Herman .................... A41F 3/02 24/513 |
| 2004/0250385 | A1 | * | 12/2004 | Folkmar ................ A44B 99/00 24/543 |
| 2007/0283729 | A1 | * | 12/2007 | Saitoh ................ E05B 73/0017 70/57.1 |
| 2013/0072870 | A1 | * | 3/2013 | Heppe ..................... H01R 4/28 604/111 |
| 2014/0090211 | A1 | | 4/2014 | Kalman |
| 2019/0254457 | A1 | * | 8/2019 | Drapeau .................. F16B 1/04 |

\* cited by examiner

CLAMPING AND HOLDING DEVICE FOR WALL MODULES

INCORPORATION BY REFERENCE

The following documents are incorporated herein by reference as if fully set forth: European Patent Application No. 19162939.3, filed Mar. 14, 2019.

TECHNICAL FIELD

In the aerospace industry, wall modules that are fastened to the inside of the aircraft fuselage are frequently used as wall linings for aircraft passenger cabins. The aircraft hull of the fuselage is formed from a structure made of frames and stringers (longitudinal stiffeners), which is covered with flat panels on the outside and clad on the inside with the curtain-like wall modules.

These wall modules are flat, usually rectangular, curved panels made of the lightest possible building materials. They are industrially prefabricated and often use sandwich panels having a honeycomb core as the basic material. Depending on the design, these wall modules already have integrated openings (for example, for windows) and fastening points and have the curvature that is necessary for fastening in the aircraft fuselage. The front side, which faces the inside of the fuselage, is often already provided with the desired surface finish. A wall module thus fulfills both a decorative and a technical function, has a noise-insulating and heatinsulating effect. It is disadvantageous that the lightweight construction makes the attachment to the aircraft fuselage and the anchoring of additional attachments very complex.

STATE OF THE ART

Such wall modules are usually attached by initially roughly aligning the wall module on the aircraft fuselage. A first, usually play-free fastening point is then determined. In this context, "play-free" means that, once fixed, it no longer allows any translational movement between the wall module and the fuselage. The wall module is then finely aligned, usually based on the position of the window openings, since deviations are most noticeable here. If the wall module is centered around the wall openings as desired, the other fastening points are fixed. This is often done via screw connections or interlocking devices that have elongated holes to allow play between the wall module and the frames.

This complex assembly is personnel-intensive and time-consuming. On the other hand, there is a desire not to hold aircraft on the ground for an unnecessarily long time for maintenance, repair and conversion. To automate assembly or disassembly, for example, with handling devices or robots, it is, however, necessary to essentially simplify the fastening process of wall modules.

SUMMARY

The present invention therefore presents a holding device which, instead of a plurality of screwing processes at a plurality of fastening points, predominantly uses a system comprising two different clamping devices. Such clamping device(s) plus a wall module are referred to below as an arrangement, as explained in more detail below.

As mentioned above, the invention is based on two clamping devices which are designed for installation in the aircraft fuselage and allow the fastening of a wall module. The system is thereby designed to hold a wall module on its upper and lower edge in a clamping manner. In this case, this "held on the upper and lower edge in a clamping manner" does not mean that a wall module must be held permanently in its end position exclusively via these two regions. Further fastening and securing points are possible, which a specialist will provide depending on the requirements. Rather, the inventive idea aims to allow a wall module to be placed and fastened in a clamping manner to the intended fuselage section (be it manually, using a handling device or a robot), in such a way that this wall module initially remains in its intended place without any further measures. Notwithstanding this, further adjustments can then be made or securing frames or fasteners, which additionally secure the wall module, can be attached. However, these additional securing devices only serve to supplement, not to replace the clamping. The inventive system described is therefore not an exclusively temporary holder.

The terms upper, lower, left and right refer to a wall module in the installed position in an aircraft fuselage. An aircraft fuselage in this case is assumed to be the aircraft hull that is usually built circular to elliptical in cross-section, which consists of a structure made of frames (circular or ellipsoid ring segments) and stringers (side members or stiffeners) and is covered with panels on the outer side. The inside of the fuselage is the cabin side, so in the installed state, a wall module consequently points with its rear side to the inside of the fuselage. The upper or lower edge of the wall module in the following does not denote the edge in the mathematical sense, but rather an edge region that is usually a few millimeters to centimeters wide. Since an aircraft is exposed to enormous temperature fluctuations, the wall modules and the aircraft fuselage made of (usually) aluminum and/or CFRP must be connected to one another with play. This is done by attaching individual wall modules at a distance from one another and covering the gaps with cover strips.

The first of the two clamping devices 30 of the holding device comprises a clamping body 33 having a first clamping jaw 31, which is fixed relative to the clamping body, and a second clamping jaw 32, which is movable relative to the clamping body 33. The term clamping body here means a connection element which, on the one hand, receives the clamping mechanism and also has connection points in order to attach the clamping body to a frame or stringer. Since this fastening between clamping body and the fuselage is not essential to the invention, it will not be discussed in more detail. It can be interpreted at the discretion of a specialist. The mobility of the clamping jaw 32 is preferably implemented by the movable clamping jaw 32 being moveably mounted on the clamping body 33 about a pivot axis 34. The rotational/pivoting movement about the axis 34 thus causes the change between the "closed" and "open" states.

The movable clamping jaw 32 is operatively connected or can be connected to an actuating lever 35. The lever can be designed (permanently operatively connected) so that an opening or closing of the movable jaw (32) can be achieved. Alternatively, the actuating lever 35 can also be designed as a holding element, catch, latch, clamp, pawl, which, only temporarily connected to the clamping jaw 32, fixes the clamping device in the "open" state. A wall module 10 can be inserted into or removed from the clamping device 30 in the "open" state. In the "closed" state, the clamping jaws 31, 32 form a receiving space 36 (that is, a gap delimited by the clamping jaw surfaces) for a wall module 10 or its upper edge 15. This receiving space 36 further has an interlocking device 37 which, in the "closed" state, fixes the position of the clamping jaws 31, 32 relative to one another and thus holds the wall module in a clamping manner.

In a first embodiment, the clamping jaw 32 can be brought into the "open" state manually by a pivoting movement about the axis 34. Here, the bolt 48 of the movable clamping jaw 32 latches in a receptacle 49 of the actuating lever 35 and thus fixes the clamping jaw 32. In this embodiment, the actuating lever 35 thus consists of an upper arm and a lower arm 50, 51 which can be pivoted about a spring-loaded axis. The upper arm 50 carries the receptacle 49, the lower arm 51 can be designed as a release element. When the wall module 10 is inserted, the lower arm 51 is actuated by applying the rear side 17 of the wall module 10, whereupon the receptacle 49 on the upper arm 50 releases the bolt 48. As a result, the movable clamping jaw 32 is released and can be brought into the "closed" state by a pivoting movement (manual, torsion spring). In the "closed" state, the clamping jaws 31, 32 are then additionally secured via the interlocking device 37.

Such a clamping device 30 advantageously has damping elements 43, 44 which are attached to the surface(s) of the clamping jaws 31, 32 facing the receiving space 36. As a result, a wall module is kept elastically dimensionally tolerant without the clamping jaws acting directly mechanically on the wall module.

The interlocking device 37 mentioned can be designed in a variety of ways. A clamping, latching, snapping or locking device 40 having a latch, a mandrel 46 or a pawl are proposed on the one hand. These elements are each positioned on one of the clamping jaws 31, 32 such that they can interlock with one another in the "closed" state. The clamping device can be unlocked by further providing a release mechanism 47 on the interlocking device 37. This can be a pull lever for a securing pin, a removal or prying of a locking spring or a similar, suitable means.

In a second embodiment, the permanently operatively connected actuating lever 35 transmits its pivoting movement about the axis 34 to the movable clamping jaw 32 and allows the change between the "closed" and "open" state. In the "closed" state, it can then be additionally interlocked, after which the actuating lever 35 can be relieved; the clamping device remains in the secured end position. Further measures can be provided in order to hold the assembly of movable clamping jaw 32 and actuating lever 35 in (a) further defined position(s). It can thus advantageously be provided that the "open" position also takes place in a defined position. This could be released by a further holding or clamping element or by the lever holding the position "open" due to its own weight.

In addition to the lever mechanism having a (rotational) pivot axis 34 described here, a taking off and parallel folding away of the movable clamping jaw 32 can equivalently be realized with the aid of two pivot levers without an axis of rotation (parallelogram guidance). The interlocking device 37 could follow the same guidelines as described above. Furthermore, the securing in the "closed" position could also be done by spring force. However, a dedicated interlocking device 37 is preferred because, for example, a checking of the interlocking device can also be established, for example, by means of mechanical indicators or sensors.

Advantageously, 32 fastening points are provided on the outer side 38 of the movable clamping jaw. These are attached to the outer side 38 pointing away from the receiving space; the side that points to the interior of the cabin in the installed state. The fastening points can be threaded bores, pins or adhesive points, which allow elements to be attached to the outer side of the clamping jaw.

A holding device for a wall module 10 comprises, in addition to at least one first clamping device 30 as described above, at least one second clamping device 20, which according to the invention is equipped with two fixed clamping jaws 21, 22, in order to hold the wall module 10 in a clamping manner at another point or edge. Viewed in cross-section, the second clamping device 20 has a fork-shaped cross-sectional profile with two clamping jaws 21, 22 which form the tines of the fork. The tines are connected by a holding bar 23 which forms a groove 25 in the space between the tines. Fix here stands for the usual meaning "immovable" relative to a base body, here to the holding bar 23.

Elements from the two clamping devices 20 and 30 and a wall module 10 form an arrangement. The wall module is typically characterized as plate-shaped and essentially flat or curved, as it is used as an element of the cabin interior lining of an aircraft cabin. The wall module 10 is usually described in such a way that its rear side 17 faces the aircraft fuselage inner wall 11 and the front side 12 faces the cabin interior (passenger compartment). The lower edge 13 of the wall module 10 thus points to the cabin floor 14 and the upper edge 15 points to the cabin ceiling.

The clamping elements are usually provided as discrete components, thus fastening the wall module selectively or in sections; this is primarily to save weight. However, at least two first clamping devices 30, 30' can advantageously be connected to one another by one or more connection element(s) 45 so that a plurality of clamping devices 30, 30' can be actuated together. These connection elements 45 can be connected to the clamping jaw via the fastening points provided on the outer side 38. The connection element can advantageously also be made flat as a cover strip or accommodate a cover strip. This creates a cover flap that can assume the function of the edge cover in addition to the clamp holder. If necessary, the cover strip can protrude beyond the clamping device such that the clamping device remains invisible after the final assembly of the inner lining. For practical reasons, the cover strip can also be designed such that it has surface regions that provide the functionality of the clamping jaw 32. In other words, the clamping jaw 32 can be part of a correspondingly constructed cover strip or the cover strip can be a construction part for one or more clamping devices 30, 30'.

In a particularly preferred embodiment, the connection element or the cover strip can have lighting elements or information means such as displays, signets, illuminated information or warning signs. This can be used to signal information such as seat numbers, connecting flights or escape routes. If such displays are equipped with touch sensitivity, interactive control elements can also be realized (call function, light switch, control elements for entertainment systems, etc.)

The position of the second clamping device 20 is provided as follows: In the assembled state in the aircraft fuselage, a (rear) clamping jaw 21 points to the inner wall 11 and the other (front) clamping jaw 22 points to the cabin interior. The wall module 10 can have one (or more) holder element(s) 26 on its rear side with a lower edge 13'. Depending on the design, this lower edge 13' of the holder element 26 or the lower edge 13 of the wall module 10 are held clamped between the two clamping jaws 21, 22 even after assembly. A lower edge 13, 13' preferably comprises (integrated) elastic elements (vibration dampers), which protrude from both the front and the rear side and thus, in the assembled state, elastically absorb part of the clamping force in contact with the clamping jaws 21, 22. Similar to the clamping mechanism for the first clamping device 30, the elastic elements prevent vibrations or other undesirable noises from being transmitted from the aircraft fuselage to the wall module 10.

The second clamping device 20 can preferably be designed as a (strand) profile element. While the clamping device 30 is preferably designed as a discrete component due to the mechanics of the movable clamping jaws, it can be advantageous with the second clamping device to mount them flush to one another as profile elements in segments so that the groove 25 is formed elongated between the clamping jaws 21, 22. A one-piece design is also possible. It is also conceivable to integrate the second clamping device into a holding element or the lateral end element of the cabin floor 14.

In order to further improve the stability of the fastening of the wall element in the assembled state, it is advantageous to attach a stop element in the groove 25 between the clamping jaws 21, 22, which stop element delimits the movement of a wall module 10 along the longitudinal extent of the second clamping device 20.

A wall element based on the invention can be assembled manually or can be performed as follows with the help of an assembly robot or handling system:

In a fuselage section of an aircraft cabin, a plurality of first clamping devices 30 are fastened to frames or stringers at suitable locations, for example, above the provided window openings. Furthermore, second clamping devices 20 are fastened to the side of the fuselage, for example, in the installed position of the (planned) floor level. The first clamping devices 30, 30' can be connected to one another with connection elements 45 and can have the flaps/cover elements described above. The clamping devices 30, 30' are set to the "open" state manually or by a handling system, by using the actuating lever(s) 35, 35' accordingly.

Wall module(s) 10 are then provided. With the help of a tool, for example, a wall module 10 can be held, lifted and brought into position on its front side 12 or on the edges. This can be done using gripping tools or vacuum holders, for example. The wall module is now inserted into the second clamping device from above or obliquely from the front, so that the lower edge 13 or 13' is held between the inside of the clamping jaws 21, 22 facing the groove. In order to facilitate insertion, it is advantageous to choose the inner spacing of the clamping jaws 21, 22 closer to one another at the open jaw end than in the region of the groove, that is, where the clamping jaws pass into the holding bar 23. This creates leeway that allows the wall module with the rear side 17 to tilt towards the inner wall 11 of the fuselage without stressing the wall module 10 to break on its lower edge. The axis of the tilting movement in this case lies in the region of the lower edge 13 between the clamping jaws 21, 22 of the second clamping device.

The wall module 10 can then be aligned on the inner wall 11 of the fuselage until the upper edge 15 strikes the clamping jaw surface 41 (or the rear damping element 43) of the fixed clamping jaw 31. The movable clamping jaw(s) can then be brought into the "closed" position. If the interlocking device 37 is designed as a snap or automatic latching device, the holder of the wall module is thereby locked up.

The movable clamping jaw 32 can be closed and interlocked by an actuating device on the robot arm or the transport holder for the wall module, or manually by an operator.

Disassembly could be carried out in a largely reverse order by first removing all holding elements apart from the first and second clamping devices 30, 20. The wall module would then be gripped, the interlocking device 37 released and the movable clamping jaw(s) 31, 31' brought into the "open" position. The wall module is pivoted slightly away from the fuselage wall in the direction of the cabin interior, wherein the lower edge 13 forms the axis of the pivoting movement in the second clamping device 20. The wall module can then be lifted out of the fork-shaped second clamping device 20 and placed, for example, on a transport frame.

This holder principle is not limited to aircraft cabins or their wall elements, but can also be used for other means of transport in which wall modules have to be installed and removed manually, with handling systems or with robots.

The materials from which the described components can be produced are based on the substances approved in aircraft construction, the selection and design of which is determined by the calculated or measured loads and forces. Aluminum, for example, but also plastics and lightweight composite materials such as GFRP, CFRP or combinations thereof will usually be used.

DETAILED DESCRIPTION

The following description of the figures relates to the advantageous embodiments in the figures. Further, equivalent embodiments result from the point of view of the general description above or through the wording of the claims. The drawings are therefore not to be understood as limiting.

Figure 1:
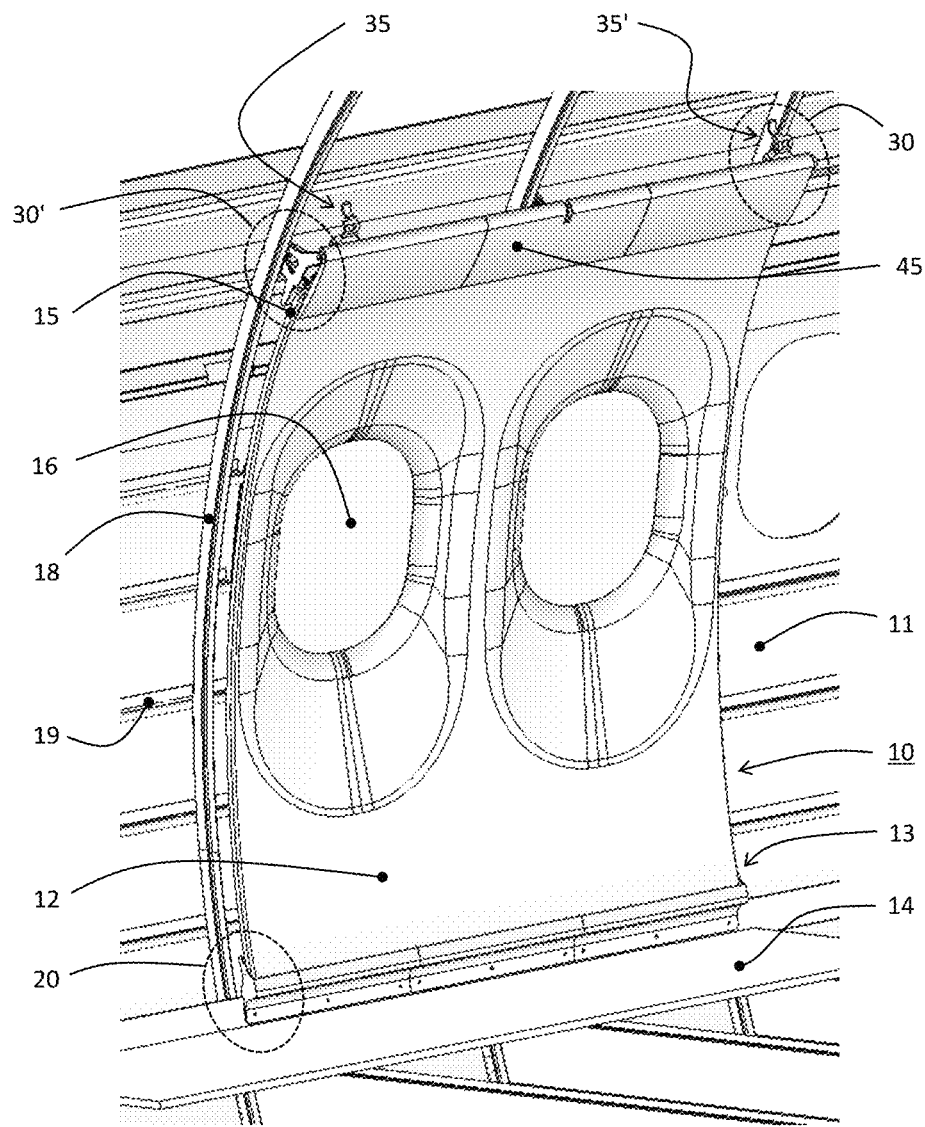
FIG. 1 shows a single wall module 10 fastened in a clamping manner to the inner structure of a fuselage section.
Figure 2A:
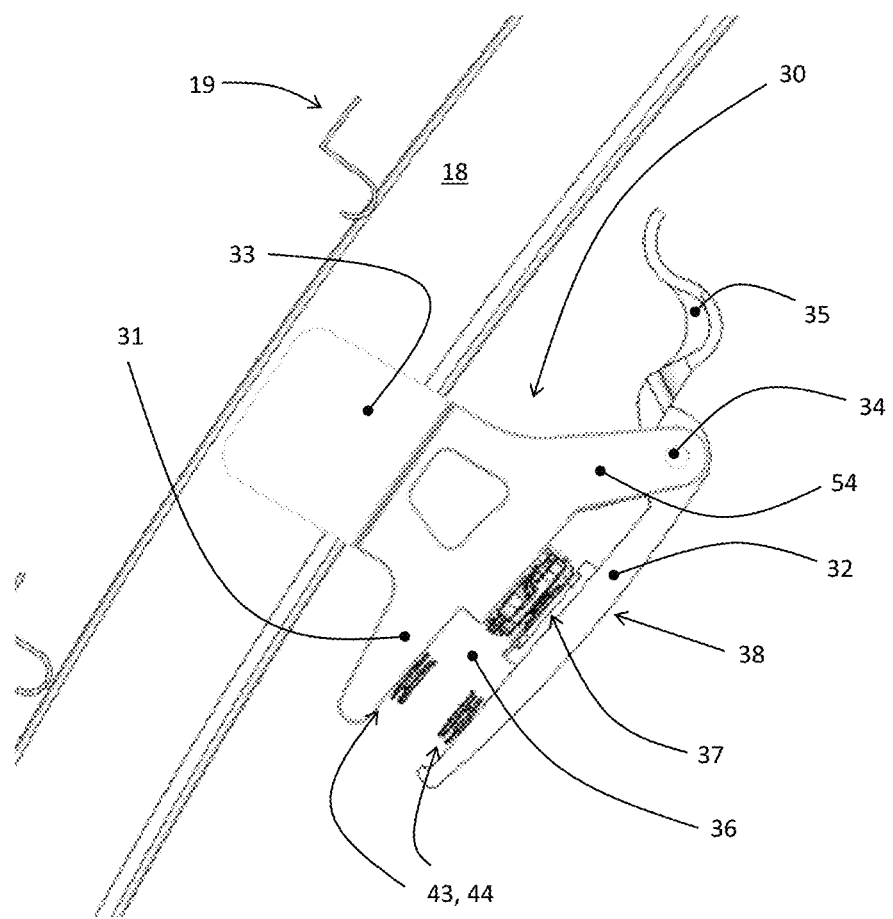
FIG. 2A shows a first clamping device 30 in a side plan view.

FIG. 1 shows an installed wall module 10 on the inner wall 11 of an aircraft fuselage. This is indicated with frames 18, stringers 19 and parts of the paneling. The front side 12 of the wall module 10 points to the interior of the cabin and already has a surface with openings for windows 16. The lower edge 13 of the wall module 10 is held in a clamping manner in the second clamping device 20, which is attached near the cabin floor 14. The upper edge 15 is held by the first clamping device(s) 30, 30'. The connection element 45 between the clamping devices 30, 30' is designed such that it acts as a cover strip or flap element. FIG. 2A shows a side view of a clamping device 30 attached to a frame 18, wherein the physical connection is made via the clamping body 33. A stringer 19 is indicated. The fixed clamping jaw 31 is shown as a component integrally attached to the clamping body 33. The second, movable clamping jaw 32 is shown here in the "closed" position. In the figure, the wall module 10 is omitted, the receiving space 36 is therefore empty. As can be seen, the damping elements 43, 44 protrude into the receiving space 36. They would clamp the wall module 10 between them elastically. The movable clamping jaw 32 is shown here as one component, also possibly in one piece, with the actuating lever 35. The pivot axis 34 is arranged on a hoist arm, the axle carrier 54. This also creates space for the interlocking device 37 between the clamping jaws 31 and 32. The outer side of the movable clamping jaw 32 is designated with 38, which can be designed as part of the connection element 45 and can have hold points or fastening points for functional elements.

Figure 2B:
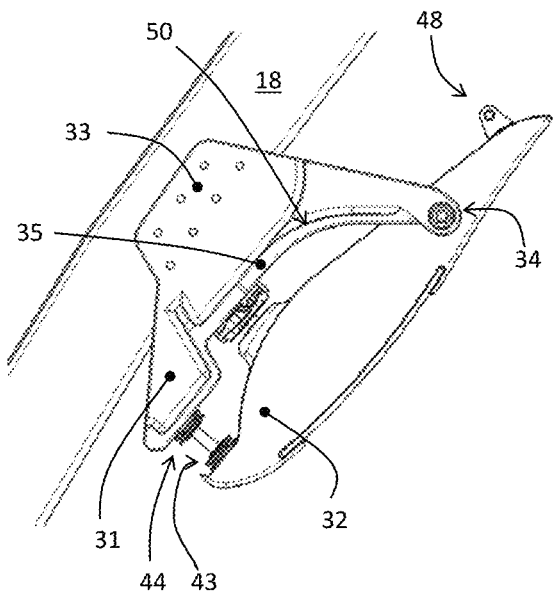
FIGS. 2B to 2E show a variant of the first clamping device 30.

FIGS. 2B to 2E show a functionally similar clamping device 30 with a different operating principle of the actuating lever 35. The component designation is basically the same as in FIG. 2A. The clamping jaw 32 is shown as a flat component in the manner of a cover strip. A bolt 48, which is part of a hold-open device, is attached at its end remote from the clamping jaw region. The actuating lever does not open and close the clamping jaw directly, but operates in the "open" state. FIG. 2B shows the "closed" state without a wall module 10 between the clamps 31, 32 enclosed by damping elements 44, 45.

Figure 2C:
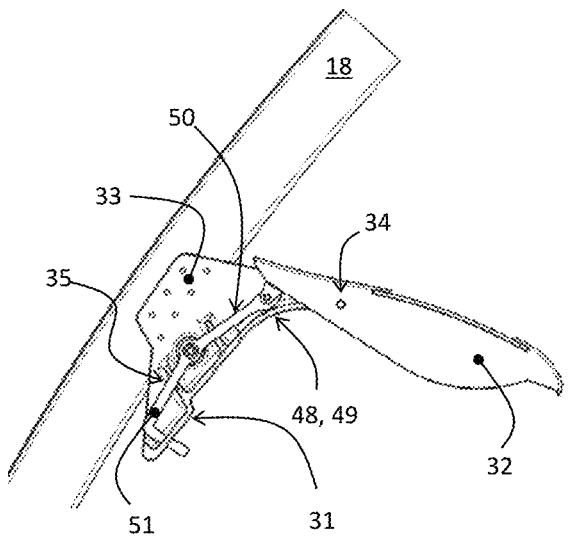

FIG. 2C shows the "open" state, held by the bolt 48 latching into the pickup 49 of the actuating lever 35. In the embodiment shown, the pickup 49 is attached to one end of the actuating lever 35, the upper arm 50. The lower half is marked as a lower arm 51 and is used as a trigger in the embodiment shown.

Figure 2D:
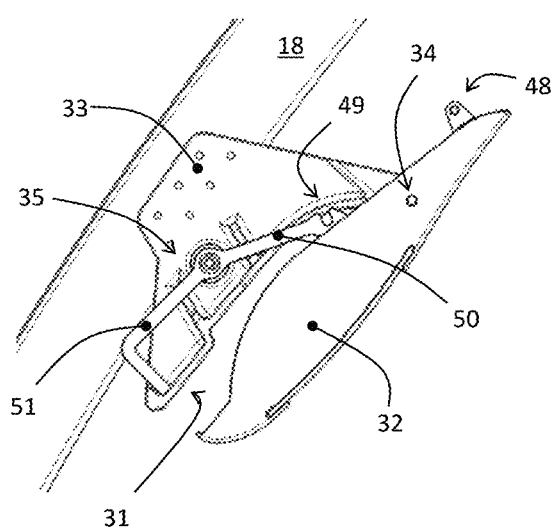
Figure 2E:
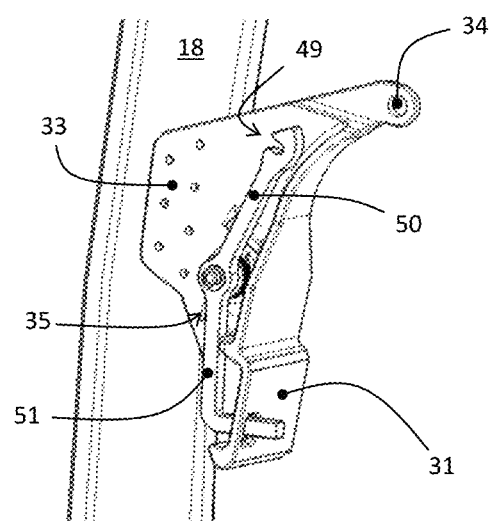

FIG. 2D shows the arrangement of the actuating lever in this embodiment somewhat more precisely. The pivot bearing between upper arm 50 and lower arm 51 is also visible. FIG. 2E is a perspective view without movable clamping jaw 32. The lower arm 51 of the actuating lever 35 protrudes into the receiving space 36 and would be pushed back by a wall module leaning against the fixed clamping jaw 31. As a result, the pickup 49 would release the bolt 48 and the clamping jaw 32, which is movable about the bearing 34 (axis of rotation) or cover strip, can move from the "open" to "closed" state.

Figure 3:
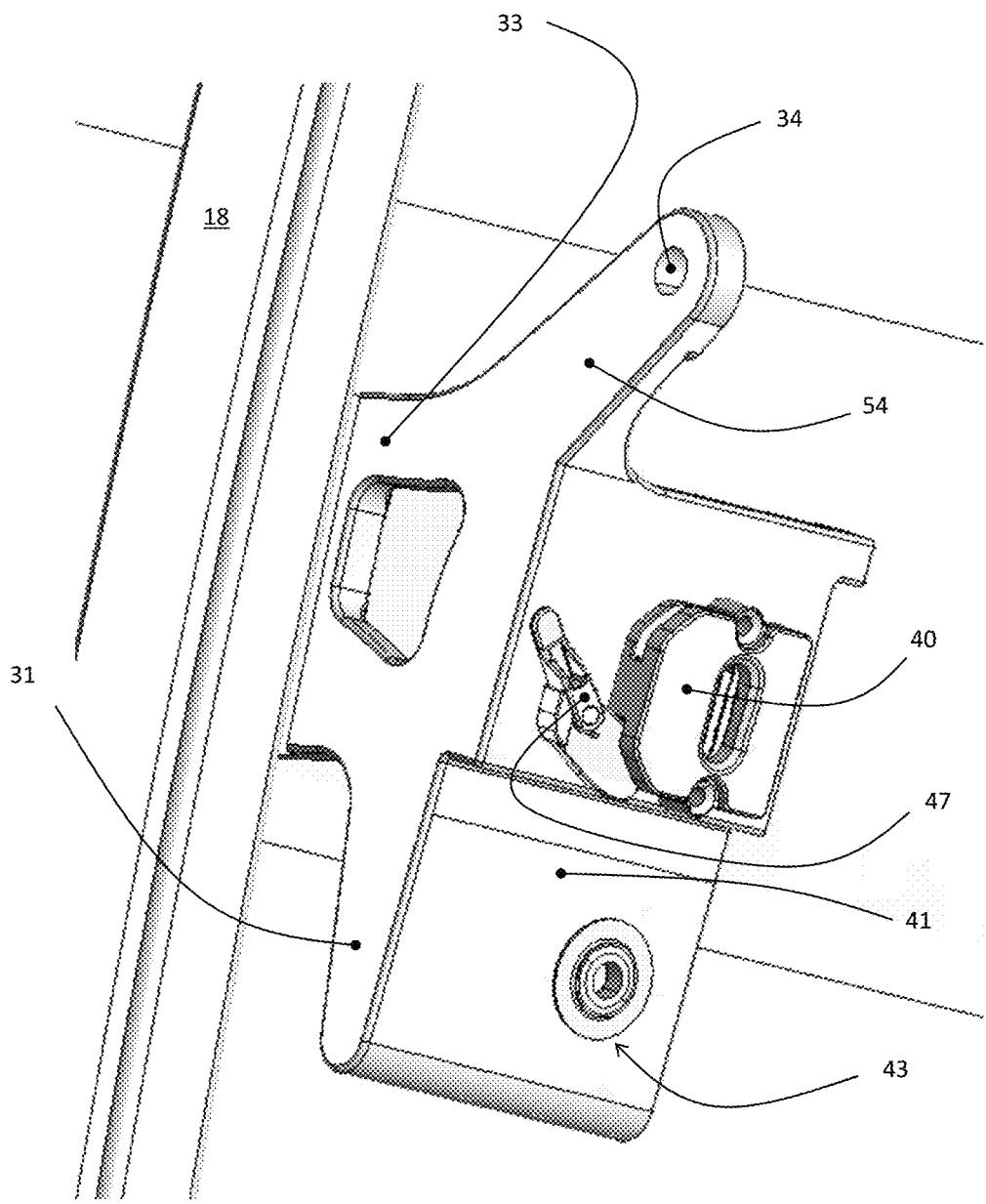
FIG. 3 shows a perspective view of a first clamping device 30, with the movable clamping jaw 32 and the actuating lever 35 being omitted.

FIG. 3 shows a clamping device 30 similar to FIG. 2A without the movable clamping jaw 32. The clamping body is fastened on the one hand to the frame 18 and on the other hand merges into the axle carrier 54 (with the receptacle 39 for the pivot axis) and the fixed clamping jaw 31. The clamping jaw surface 41 defines a (rear) boundary surface of the receiving space 36 shown above and receives the rear damping element 43. The locking device 40 is also arranged in the space between the jaws as part of the interlocking device 37. The receptacle for a (interlocking device) mandrel 46 (see FIG. 4) is shown here. A release mechanism 47 allows the locking device 40 to be unlocked.

Figure 4:
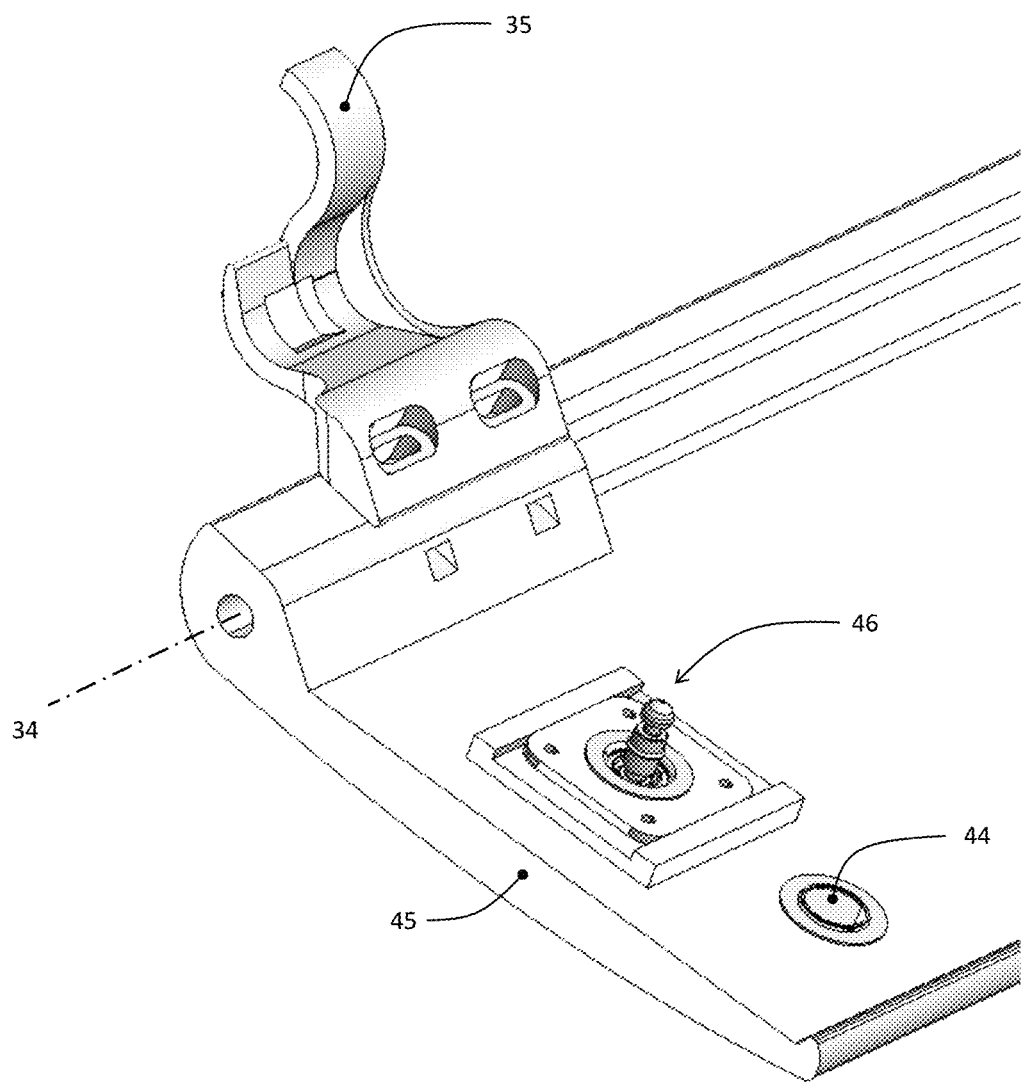
FIG. 4 shows a plan view of a movable clamping jaw 32, which is embodied integrally with the connection element 45.

FIG. 4 shows the view of a movable jaw 32 as an integral part of a connection element 45/cover, designed as a plate-shaped flap component. The position of the pivot axis 34 and actuating lever 35 show that the viewing direction is directed towards the inside of the clamping device 30. The front damping element 44 is the technical counterpart to the damping element 43 from FIG. 3. The (interlocking device) mandrel 46 is provided for receiving in the locking device 40 and supplements this for the interlocking device 37.

Figure 5A:
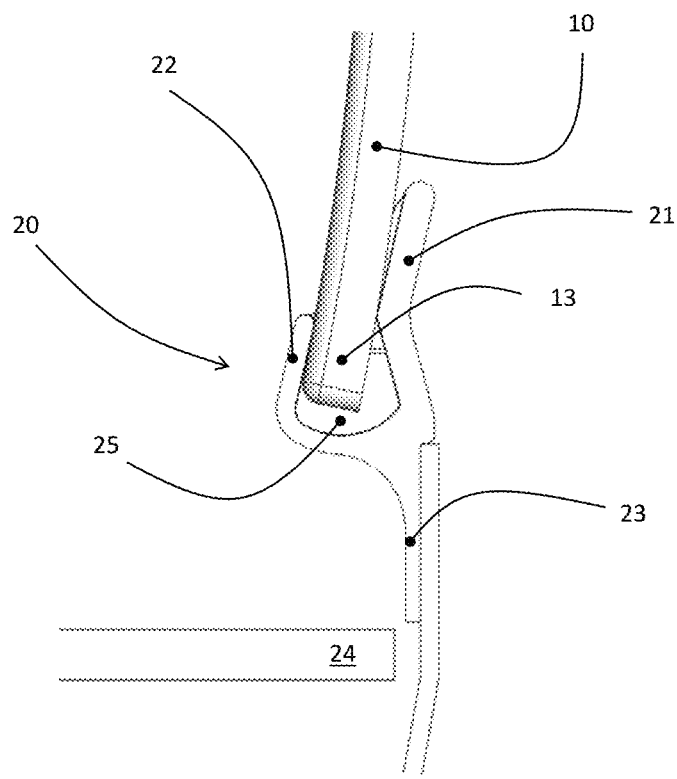
FIG. 5A shows a second clamping device 20 in a lateral section.
Figure 5B:
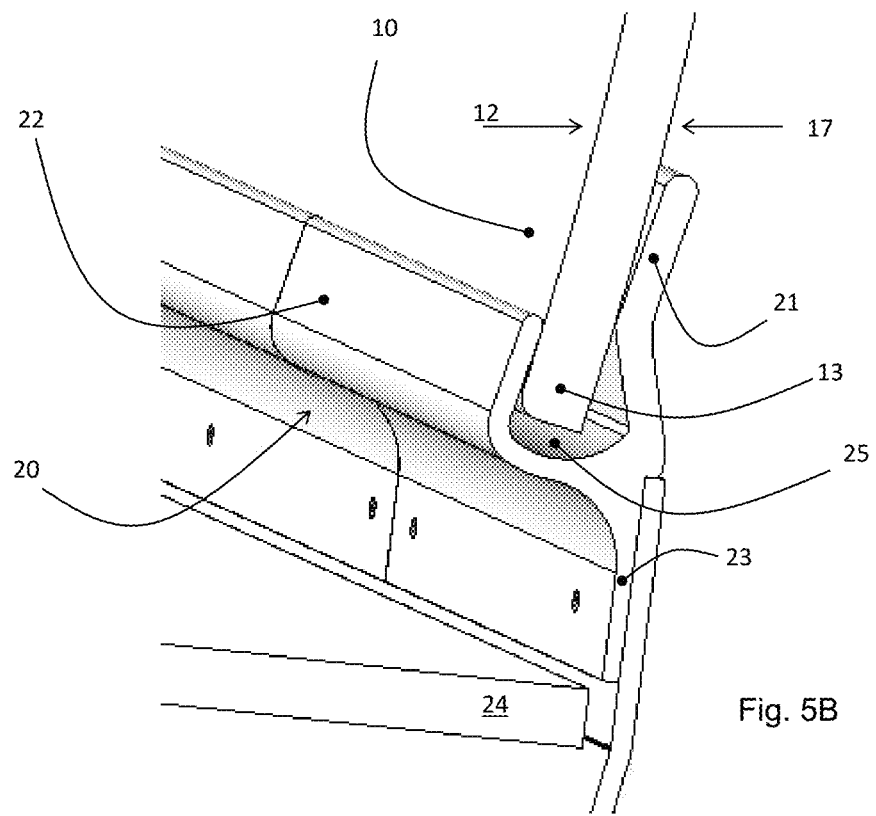
FIG. 5B shows a perspective view of a second clamping device 20, similar to FIG. 5A, and FIGS. 5C and 5D show alternative embodiments of the second clamping device 20.

FIGS. 5A and 5B show, once in section and in perspective view, how a wall element 10 is held on its lower edge 13 in the second clamping device 20. The embodiment shown here shows, viewed from the floor element 24, a raised rear (unloaded) clamping jaw 21. This serves to facilitate assembly and disassembly because a sliding surface for the rear side 17 of the wall module 10 is created during installation or removal. The front clamping jaw 22 is connected to the rear clamping jaw via the holding bar 23, the groove 25 created between them is clear in both figures. Clamping thus takes place for the front side 12 on the front clamping jaw 22 and for the rear side 17 through the rear clamping jaw 21. Possible elastic damping elements are not shown in FIG. 5A or 5B at the lower edge 13.

Figure 5C:
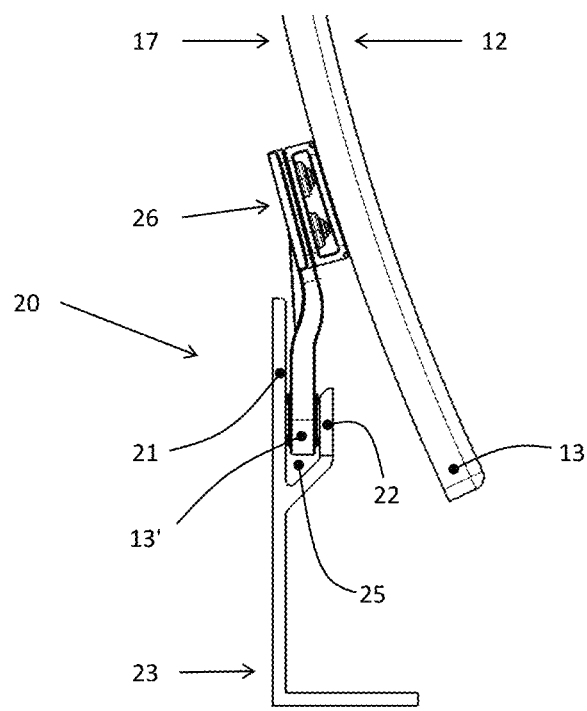
Figure 5D:
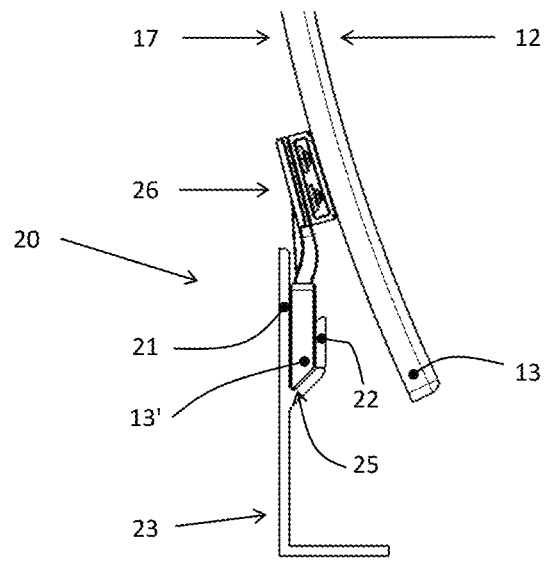

FIGS. 5C and 5D show an alternative, concealed clamp fastening. It is not the lower edge 13 of the wall module itself, but the lower edge 13' of a holder element 26 that is clamped between the clamping jaws 21 and 22. The holder 26 is fastened to the rear side of the wall module 10 (optionally with damping elements) and diverts the dead weight of the wall module into the clamping device 20. As shown in FIG. 5D, the lower edge can also be designed with a positive fit so that it fills the space between the clamping jaws 21, 22 and the groove 25.

The features of the invention disclosed in the above description, in the drawings and in the claims can be essential for realizing the invention both individually and in any, but technically meaningful or advantageous combination. A nonexplicit representation of a combination of features does not mean that such a combination is not useful or not possible.

The invention claimed is:

1. A clamping device for a plate-shaped, essentially flat wall module, comprising:
   a clamping body;
   a first clamping jaw which is fixed relative to the clamping body;
   a second clamping jaw which is movable relative to the clamping body and includes an actuating lever that is either permanently operatively connected to open and close the movable clamping jaw, or is temporarily connected so that the clamping device is held in an open state; and in a closed state, the clamping jaws form a receiving space for a wall module; and
   an interlocking device in the receiving space, the interlocking device fixes a position of the clamping jaws to one another in the closed state;
   wherein the interlocking device comprises a clamping, latching, snapping or locking device and a latch, a mandrel or pawl, each being positioned on one of the clamping jaws such that they interlock with one another in the closed state.

2. The clamping device according to claim 1, wherein the clamping jaws have damping elements on surfaces thereof facing the receiving space.

3. The clamping device according to claim 1, wherein the interlocking device further comprises a release mechanism.

4. The clamping device according to claim 1, wherein the movable clamping jaw is rotatably mounted on the clamping body for movement about a pivot axis.

5. The clamping device according to claim 1, wherein the movable clamping jaw has fastening points on an outer side thereof pointing away from the receiving space.

6. A holding device comprising:
   at least one first clamping device for a plate-shaped, essentially flat wall module, the at least one first clamping device including:
      a clamping body;
      a first clamping jaw which is fixed relative to the clamping body;
      a second clamping jaw which is movable relative to the clamping body and includes an actuating lever that is either permanently operatively connected to open and close the movable clamping jaw, or is temporarily connected so that the clamping device is held in an open state; and in a closed state, the clamping jaws form a receiving space for a wall module; and an interlocking device in the receiving space, the interlocking device fixes a position of the clamping jaws to one another in the closed state; and at least one second clamping device, the second clamping device includes two fixed clamping jaws.

7. The holding device according to claim 6, wherein the second clamping device has a fork-shaped cross-sectional profile defined by the two clamping jaws with a groove formed therebetween, and a holding bar.

8. An arrangement comprising: a plate-shaped, essentially flat to curved wall module of a cabin interior lining of an aircraft cabin and a holding device according to claim 6, the wall module includes a rear side configured to face an inside of an aircraft fuselage inner wall and a front side configured to face a cabin interior and a lower edge of the wall module is adapted to point to a cabin floor and an upper edge is adapted to point to a cabin ceiling.

9. The arrangement according to claim 8, wherein the at least one first clamping device comprises at least two of the first clamping devices that are connected to one another by a connection element such that the clamping devices are actuatable together.

10. The arrangement according to claim 9, wherein the connection element constitutes or receives a cover strip which has lighting elements or information elements selected from at least one of displays, signets, illuminated information, or warning signs.

11. The arrangement according to claim 8, wherein the second clamping device is configured such that in an assembled state of the arrangement, in the aircraft fuselage, one of the clamping jaws points to the inner wall and the other of the clamping jaws points to the cabin interior, and the lower edge of the wall element or the lower edge of a holder element attached to the rear side is held clamped between the two clamping jaws after assembly.

12. The arrangement according to claim 8, wherein the lower edge of the wall module or the holder element comprises elastic elements which protrude both from the front side and the rear side and in an assembled state, elastically absorb part of the clamping force in contact with the clamping jaws.

13. The arrangement according to claim 8, wherein the second clamping device is configured as a profile element and the groove is formed elongated between the clamping jaws, and the profile is designed in one piece or in segments that are adapted for fastening in an aircraft fuselage.

14. The arrangement according to claim 8, further comprising a stop element that is attachable in the groove between the clamping jaws, said stop element delimits a movement of the wall module along a longitudinal extent of the second clamping device.

* * * * *